Figure 1:
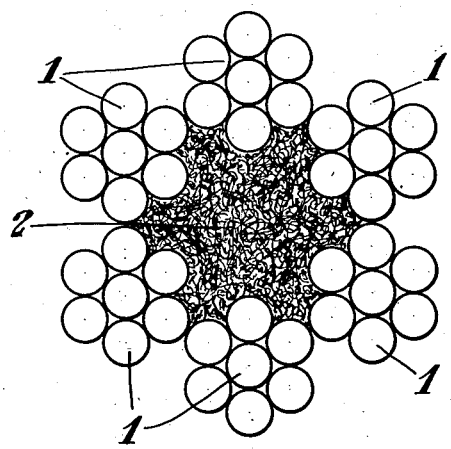

Feb. 14, 1939. F. H. ELLSWORTH ET AL 2,147,118
WIRE ROPE CENTER
Filed Jan. 15, 1938

Inventors:
FRANK H. ELLSWORTH
and CHARLES W. WALKER.
by: *Usina & Lauber*
their Attorneys.

Patented Feb. 14, 1939

2,147,118

UNITED STATES PATENT OFFICE 2,147,118

WIRE ROPE CENTER

Frank H. Ellsworth and Charles W. Walker, Worcester, Mass., assignors to The American Steel and Wire Company of New Jersey, a corporation of New Jersey Application January 15, 1938, Serial No. 185,225

5 Claims. (Cl. 117—59)

This invention relates to wire rope, and particularly to the fibrous center used in conjunction with certain types of the same.

A properly made fiber rope center provides a flexible, uniform, firm supporting means for the outer rope strands. This serves to keep the strands apart and prevent their rubbing on each other under normal loads. Any lack of uniformity in the center makes for a corresponding irregularity in the outer rope contour and, because such surface irregularities provide points of extreme wear, the rope center should be uniform. Furthermore, the center must be capable of sufficient elongation to compensate for the stretch of the rope under load, and it must be elastic enough to provide sufficient resiliency when loaded to return the strands to their normal position when the load is released. Finally, a fiber center should be lubricant-absorbent to a sufficient degree to permit the storage of enough lubricant to keep the rope wires lubricated when the rope is in service.

Usually, such centers are made of vegetable fibers such as the abaca fibers which include hemp, java, sisal, jute, etc.

It has been found that vegetable fiber rope centers are easily attacked and disintegrated by acids. Under certain natural conditions, wire rope is subjected to acids sufficiently concentrated to completely disintegrate fibrous rope centers of any abaca species. Thus, ropes used for oil well drill lines and ropes employed in contact with acid mine water fail prematurely because their centers collapse through becoming disintegrated.

The present invention is based on the discovery that animal fibers resist the action of acids in such concentrations as would char materials of vegetable source, and that animal fibers can be manufactured into rope centers having the physical requirements previously outlined. Therefore, the present invention may be said to be a wire rope having a center made of animal fiber or, more broadly, as constituting wires laid over animal fiber. This last is advanced because in some cases assemblies which might not be technically termed ropes may utilize the invention to advantage, and also because certain types of rope include fiber strand centers as well as fiber rope centers.

Any animal fiber with sufficient serrations to permit the fiber being felted, and any animal fiber of sufficient length to be spun, may be used as the rope center. Thus, felted wool rope or cord, spun wool rope or cord, silk cord or rope, or any continuous strand fabricated in any manner from fibers of any animal source are applicable.

A specific example may be a wire rope having a center made of animal fiber, such as wool, felted into a mass of sufficient elasticity to properly support the cable wires, and with an elastic limit sufficiently high to prevent its permanent deformation when the cable is loaded to the limit for which it is designed, this center being lubricant-absorbent and more acid resistant than a center of vegetable fiber. In other words, a wire rope center may be made of animal fiber to possess the same advantages as accrue from the use of vegetable fiber and which is, in addition, greatly superior to the latter respecting its acid resistance.

Figure 2:
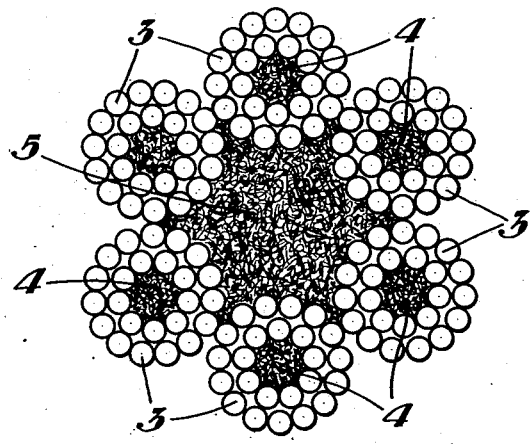

Specific examples of the invention are illustrated by the accompanying drawing, in which:

Figure 1 is a cross-section of a 6 x 7 wire rope embodying the features disclosed; and Figure 2 is a cross-section of a 6 x 24 so called 7-hemp center rope, the hemp centers being substituted by animal fiber centers.

More specifically, in Figure 1 six strands of seven intertwisted wires 1 are helically laid over an animal fiber center 2 possessing the characteristics described. In Figure 2 six strands of twenty-four wires 3 are helically laid over animal fiber centers 4, these strands being helically laid over an animal fiber rope center 5. The invention may obviously be applied to any stranded wire construction requiring a fibrous center.

We claim:

1. A wire rope having a center made solely of animal fiber.

2. A wire rope having a center made of wool felted into an elastic body, said center being free from vegetable matter.

3. A wire rope having a center made of silk, said center being free from vegetable matter.

4. A wire rope having a center made of animal fiber felted into a mass of sufficient elasticity to properly support the cable wires and with an elastic limit sufficiently high to prevent its permanent deformation when the cable is loaded to the limit for which it is designed, said center being lubricant-absorbent, more acid-resistant than vegetable fiber and entirely free of the latter.

5. A wire rope or strand including a center and a plurality of wires helically laid over said center with the latter radially supporting said wires when said rope or strand is tensioned, said center being made entirely of animal fiber worked to possess the physical characteristics of the usual vegetable fiber center, said animal fiber being inherently more acid-resistant than said usual vegetable fiber center and said rope or strand being entirely free from the latter.

FRANK H. ELLSWORTH.
CHARLES W. WALKER.